United States Patent [19]
White et al.

[11] Patent Number: 6,166,756
[45] Date of Patent: Dec. 26, 2000

[54] MULTIPLE CHANNEL DATA WRITING DEVICE

[75] Inventors: Robert Courtney White, Fairfax; Adam Thomas Drobot, Annandale; Newell Convers Wyeth, Oakton; Albert Myron Green, Alexandria, all of Va.

[73] Assignee: Science Applications International Corporation, San Diego, Calif.

[21] Appl. No.: 09/089,136

[22] Filed: Jun. 2, 1998

[51] Int. Cl.$^7$ .......................................................... B41J 2/47
[52] U.S. Cl. ............................................. 347/239; 347/238
[58] Field of Search ...................................... 347/239, 238, 347/255, 242, 129; 385/29; 355/1, 40; 359/127, 290, 291; 369/100, 103, 112

[56] References Cited

U.S. PATENT DOCUMENTS

| | | |
|---|---|---|
| 3,112,360 | 11/1963 | Gregg . |
| 3,220,013 | 11/1965 | Harris ..................................... 347/239 |
| 3,892,468 | 7/1975 | Dunguay . |

(List continued on next page.)

FOREIGN PATENT DOCUMENTS

| | | |
|---|---|---|
| 0 092 420 | 10/1983 | European Pat. Off. . |
| 0 784 314 | 7/1997 | European Pat. Off. . |
| 37 17 604 | 11/1987 | Germany . |

OTHER PUBLICATIONS

Abstract of D.E. Brei and J. Blechschmidt, "Design and Static Modeling of a Semicircular Polymeric Piezoelectric Microactuator", (JMEMS, vol. 1, No. 3, p. 106) Sep. 1992.

Abstract of K. Minami, S. Kawamura, and M. Esashi, "Fabrication of Distributed Electrostatic Micro Actuator (DEMA)", (JMEMS, vol. 2, No. 3, p. 121 et. seq.) Sep. 1993.

Abstract of Q. Meng, M. Mehregany, and R. L. Mullen, "Theoretical Modeling of Microfabricated Beams with Elastically Restrained Supports", (JMEMS, vol. 2, No. 3, p. 128 et. seq.) Sep. 1993.

Abstract of M. Ataka, A. Omodaka, N. Takeshima, and H. Fujita, "Fabrication and Operation of Polyimide Bimorph Actuators for a Ciliary Motion System", (JMEMS, vol. 2, No. 4, p. 146) Dec. 1993.

Abstract of J.G. Smits and A. Ballato, "Dynamic Admittance Matrix of Piezoelectric Cantilever Bimorphs", (JMEMS, vol. 3, No. 3, p. 105 et. seq.) Sep. 1994.

Abstract of J.W. Judy, R.S. Muller, and H.H. Zappe, "Magnetic Microactuation of Polysilicon Flexure Structures", (JMEMS, vol. 4, No. 4, p. 162) Dec. 1995.

Abstract of T.S. Low and W. Guo, "Modeling of a Three-–Layer Piezoelectric Bimorph Beam with Hysteresis", (JMEMS, vol. 4, No. 4, p. 230) Dec. 1995.

(List continued on next page.)

*Primary Examiner*—N. Le
*Assistant Examiner*—Lamson D. Nguyen
*Attorney, Agent, or Firm*—Banner & Witcoff, Ltd.

[57] ABSTRACT

An integrated optoelectronic chip 116 produces multiple modulatable outputs in a read write head. An array of light guides in a light guide switchyard has some terminations at output apertures and some at beam dumps within the read/write head. The beam dumps absorb and dissipate any light conveyed to them. The beam switches allow control of the direction of light emitted from an on-board laser 106 which enters the array of light guides. By switching between a respective beam dump and a respective output aperture, the beam switch is used to modulate the output from the aperture. The light emitted can be imaged onto a target surface by a lens system or a single holographic element. In an alternative embodiment, instead of dumping the light to a beam dump, it can also be directed away from the target surface. An optoelectronic chip for modulating multiple outputs can be formed without an embedded laser. Instead, a separate laser may be connected to a chip having light guides, optoelectronic switches, and beam dumps, only.

36 Claims, 9 Drawing Sheets

6,166,756
Page 2

U.S. PATENT DOCUMENTS

| | | | |
|---|---|---|---|
| 4,058,736 | 11/1977 | Takahashi et al. | |
| 4,135,083 | 1/1979 | Van Alem et al. | |
| 4,193,091 | 3/1980 | Kleuters et al. | |
| 4,234,788 | 11/1980 | Palmer et al. | |
| 4,337,531 | 6/1982 | Willemsen | |
| 4,482,986 | 11/1984 | Noda et al. | |
| 4,507,765 | 3/1985 | Suzuki et al. | |
| 4,544,259 | 10/1985 | Kanaoka et al. | 355/1 |
| 4,564,268 | 1/1986 | Tatsuno et al. | |
| 4,572,949 | 2/1986 | Bowers et al. | |
| 4,737,946 | 4/1988 | Yamashita et al. | |
| 4,744,073 | 5/1988 | Sugiki | |
| 4,755,668 | 7/1988 | Davis | |
| 4,763,973 | 8/1988 | Inoue et al. | |
| 4,767,210 | 8/1988 | Kashyap | |
| 4,771,415 | 9/1988 | Taki | |
| 4,815,807 | 3/1989 | Kaneko et al. | |
| 4,858,215 | 8/1989 | Yano et al. | |
| 4,991,160 | 2/1991 | Premji | |
| 5,001,338 | 3/1991 | Boero | |
| 5,010,346 | 4/1991 | Hamilton et al. | |
| 5,070,488 | 12/1991 | Fukushima et al. | |
| 5,109,459 | 4/1992 | Eibert et al. | |
| 5,121,449 | 6/1992 | Shiba et al. | |
| 5,128,915 | 7/1992 | Yamashita et al. | |
| 5,144,604 | 9/1992 | Sugiura | |
| 5,144,616 | 9/1992 | Yasukawa et al. | |
| 5,195,152 | 3/1993 | Gupta | |
| 5,278,812 | 1/1994 | Adar et al. | |
| 5,289,454 | 2/1994 | Mohapatra et al. | |
| 5,293,291 | 3/1994 | Ohki et al. | |
| 5,317,148 | 5/1994 | Gray et al. | |
| 5,390,157 | 2/1995 | Revelli, Jr. | |
| 5,414,785 | 5/1995 | Bergmann | 385/24 |
| 5,416,881 | 5/1995 | Ikeda | |
| 5,422,469 | 6/1995 | Bard et al. | |
| 5,444,689 | 8/1995 | Ohki et al. | |
| 5,452,382 | 9/1995 | Shionoya et al. | |
| 5,661,591 | 8/1997 | Lin et al. | |
| 5,802,222 | 9/1998 | Rasch et al. | 385/14 |
| 5,940,564 | 8/1999 | Jewell | 385/93 |

OTHER PUBLICATIONS

Abstract of Yuji Uenishi, Hidenao Tanaka, and Hiro Ukita, "AlGaAs/GaAs micromachining for monolithic integration of optical and mechanical components", (Proc. SPIE vol. 2291, p. 82–91, Integrated Optics and Microstructures II, Massood Tabib–Azar; Dennis L. Polla; Ka–Kha Wong; Eds. Oct. 1994).

Scanning Device Using Fiber Optic Bimorph (Adam Thomas Drobot, Robert Courtney White). Our reference: 00479.02150, U.S. Application Serial No. 09/089,138, filed Jun. 2, 1998.

Multiple Parallel Source Scanning Device (Adam Thomas Drobot, Robert Courtney White, Newel Convers Wyeth). Our Reference: 00479.02151, U.S. Application Serial No. 09/089,137, filed Jun. 2, 1998.

Method and Apparatus for Controlling the Focus of a Read/Write Head for an Optical Scanner (Edward Alan Phillips, Newel Convers Wyeth). Our Reference: 00479.02154, U.S. Application Serial No. 09/088,781, filed Jun. 2, 1998.

Multiple Channel Scanning Device Using Optoelectronic Switching (Adam Thomas Drobot, Robert Courtney White, Newel Convers Wyeth). Our Reference: 00479.02153, U.S. Application Serial No. 09/088,782, filed Jun. 2, 1998.

Multiple Channel Scanning Device using Oversampling and Image Processing to Increase Throughput (Adam Thomas Drobot, Robert Courtney White, Newel Convers Wyeth, Albert Myron Green, Edward Alan Phillips). Our Reference: 00479.02155, U.S. Application Serial No. 09/088,780, filed Jun. 2, 1998.

Fig. 1

PRIOR ART

MULTIPLE CHANNEL DATA WRITING DEVICE

BACKGROUND OF THE INVENTION

Figure 1:
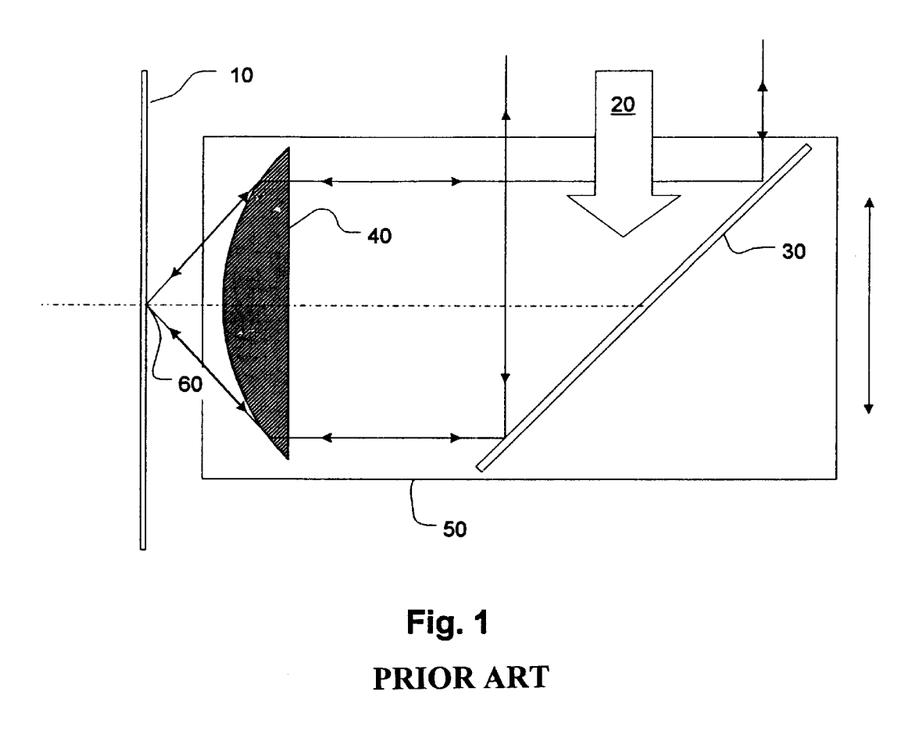
FIG. 1 is a ray trace diagram showing a scanning device according to the prior art.

Various optical scanners are known for such applications as data storage, bar code reading, image scanning (surface definition, surface characterization, robotic vision), and lidar (light detection and ranging). Referring to FIG. 1, a prior art scanner 50 generates a moving spot of light 60 on a planar target surface 10 by focusing a collimated beam of light 20 through a focusing lens 40. If the assembly is for reading information, reflected light from the constant intensity spot 60 is gathered by focusing lens 40 and returned toward a detector (not shown). To write information, the light-source is modulated. To cause the light spot 60 to move relative to the surface 10, either the surface 10 is moved or the scanner 50 is moved. Alternatively, the optical path could have an acousto-optical beam deflector, a rotating prism-shaped mirror, or a lens driven galvanometrically or by piezoelectric positioners. Scanners also fall into two functional groups, raster and vector. Both types generally use the same types of beam deflection techniques.

Higher-speed raster scanners use either spinning prism-shaped (polygonal cross-sectioned) mirrors or multifaceted spinning holograms (hologons). Performance parameters for these conventional beam deflection techniques are listed in Table 1. The discrete optics in these devices are generally associated with high costs for mass manufacture, assembly and alignment.

TABLE 1

Performance of Conventional Beam Deflectors for Optical Scanning.

| Parameter | Polygonal Mirrors | Galvano-Driven Mirrors | Hologons Trans-mission) | Acousto-Optic Deflectors |
|---|---|---|---|---|
| Wavefront Distortion | $\lambda/8$ at 0.55 $\mu m$ | $\lambda/8$ at 0.55 $\mu m$ | $\lambda/6$ at 0.55 $\mu m$ | $\lambda/2$ at 0.55 $\mu m$ |
| area resolution (spot-widths/sec | 25,000 (scan lens limited) | 25,000 (scan lens limited) | 25,000 (scan lens limited) | 1,000 (scan lens limited) |
| Cross-axis error | 1 0 arc sec (uncorrected) | 1–2 arc sec (uncorrected) | 10 arc sec | 0 |
| Speed (spot widths/sec) | $1 \times 10^8$ | $2 \times 10^6$ | $2 \times 10^7$ | $2.8 \times 10^7$ |
| Bandwidth | 0.3–20 $\mu m$ | 0.3–20 $\mu m$ | Mono-chromatic | mono-chromatic |
| Scan efficiency | 80–1 00% | 65–90% | 90% | 60–80% |

(from The Phoionics Design and Applications Handbook 1993, Laurin Publishing Co., Inc., p.H-449)

The performance parameters listed in Table 1 assume different levels of importance depending on the optical scanning application. For raster scanning to cover extended surface areas, the emphasis is on speed, area resolution, and scan efficiency. Wide bandwidth is needed if the surface is to be color scanned. For applications requiring vector scanning of precise paths at high resolution, the optical system typically uses a monochromatic, focused spot of light that is scanned at high speed with low wavefront distortion and low cross-axis error. Optical data storage has been a prime application of this type of optical scanning.

In optical data storage media, information is stored as an array of approximately wavelength-size dots (bit cells) in which some optical property has been set at one of two or more values to represent digital information. Commercial read/write heads scan the media with a diffraction-limited spot, typically produced by focusing a collimated laser beam with fast objective lens system as shown in FIG. 1. A fast objective lens, one with a high numerical aperture, achieves a small spot size by reducing Fraunhofer-type diffraction. The spot is scanned by moving an assembly of optical components (turning mirror, objective lens, position actuators) over the optical medium, either along a radius of a disc spinning under the spot or across the width of a tape moving past the head. The assembly moves in one dimension along the direction of the collimated laser beam. As the disk spins or the tape feeds, the line of bit cells must be followed by the spot with sufficient precision to avoid missing any bit cells. The fine tracking is achieved by servo mechanisms moving the objective lens relative to the head assembly. An auto-focus servo system is also necessary to maintain the diffraction limited spot size because the medium motion inevitably causes some change in the mean/ medium separation with time. Proper focus adjustment is possible because the medium is flat and smooth. Such a surface reflects incident light in well-defined directions like a mirror. Light reflected from the medium is collected by focusing optics and sent back along the collimated beam path for detection.

Scanning by several spots simultaneously is used to achieve high data rates through parallelism in one known system called the CREO® optical tape system. One scanning device that avoids reliance on discrete optical elements to achieve scanning is described in U.S. Pat. No. 4,234,788. In this scanner, an optical fiber is supported rigidly at one end in a cantilevered fashion. The supported end of the fiber is optically coupled to a light emitting diode or photo diode for transmitting or receiving light signals, respectively. The fiber is free to bend when a force is exerted on it. The fiber can thus be made to scan when light from the light-emitting diode emanates from the tip of the fiber ss the fiber is forced back and forth repeatedly. To make the fiber wiggle back and forth an alternating electric field, generally perpendicular to the axis of the fiber, is generated. The fiber is coated with a metallic film. A charge is stored on the film, especially near the tip, by forming a capacitance with a metallized plate oriented perpendicularly to the fiber axis (optically at least partly transparent). The stored charge makes the fiber responsive to the electric field.

A drawback of this device is the limit on the speeds with which the fiber can be made to oscillate. The device requires a series of elements to move the fiber: an external field-generating structure, a DC voltage source to place charge on the fiber coating, an AC source to generate the external field. Another drawback of this prior art mechanism is the inherent problem of stress fractures in the fiber optics. Bending the fiber repeatedly places serious demands on the materials. Problems can arise due to changes in optical properties, changes in the mechanical properties causing unpredictable variation in the alignment of the plane followed by the bending fiber, the amplitude of vibration, the natural frequency of vibrations, and structural failure. Still another limitation is imposed by the need to place a conductor between the fiber tip and the optical medium to form the capacitance. This places another optical element between the fiber tip and the scanned surface and makes it impossible to sweep the tip very close to the scanned surface as may be desired for certain optical configurations.

Another prior art scanning device is described in U.S. Pat. No. 5,422,469. This patent specification describes a number of different devices to oscillate the end of an optical light guide or optical fiber. One embodiment employs a piezo-electric bimorph connected to the free end of a device to which the free end of an optical fiber and a focusing lens are attached. Reflected light is directed back through the fiber to a beam splitter which directs the reflected light out of the bidirectional (outgoing/return) path at some point along the fiber remote from the source of light. The above embodiment uses a simpler prime mover, a piezo-electric bimorph. However, the need for a focusing lens attached to the end of the fiber, by increasing the mass, imposes difficult practical requirements for high speed oscillation of the fiber. In addition, to achieve very small projected spot size requires a high numerical aperture at the output end of the focusing optics. It is difficult to achieve this with the conventional optics contemplated by the '469 disclosure. Furthermore, the reciprocation of the fiber as described in the '469 patent requires a multiple-element device. Friction between the motor and the fiber can cause changes in the optical properties of the fiber, and mechanical changes in the motor, the fiber, or the interface, that result in changes (which may be unpredictable) in the amplitude of oscillation or the resonant frequency of the motor-fiber combination (which might generate, or be susceptible to, undesired harmonics). Also, the process of assembly of such a combination of a motor and a fiber presents problems. Ideally, for high frequency operation, the device would be very small.

Common to all storage/retrieval devices is the need for greater and greater data rates. Increases in speed have been achieved by increasing the speed of scanning. However, there are practical limits, particularly with regard to the writing operation, relating to physical properties inherent in the optical media.

Also common to the applications of optical scanning technology is the need for great precision in the focus of the scanning light source and the return signal.

SUMMARY OF THE INVENTION

According to an embodiment, the invention provides an optical scanner employing an array of optical fibers driven by a micro electro-mechanical systems (MEMS) motor. The fibers are held on a stage which is oscillated by a MEMS motor. The light collected from the tips of the fibers is captured and focused to an array of small spots by imaging optics which, in this embodiment, are fixed relative to the scanned surface. This generates a rapidly sweeping array of light spots on the scanned surface. In alternative embodiments, the focusing optics are oscillated and the fiber array is held fixed. In another embodiment, the focusing optics and the fiber array are oscillated as a single assembly. Other motors may be used with the invention.

According to another embodiment, the invention provides a device for writing data to a target surface of a piece of media. The structure of the media can be modified by impingement of light. The device has a base element with a light source, light guides, optical switches, multiple output apertures, and at least one beam dump interconnected in such a way that light from the light source is selectively conveyed to the output apertures and/or to the at least one beam dump. The output apertures are arranged relative to the target surface such that the light emitted from the apertures impinges on the target surface. The device has a controller connectable to a data source to receive data signals. The controller is connected to control the switches. The controller is programmed to control the switches to selectively convey light to the output apertures or to the beam dump such that the light is impinged on the target surface in such a way as to result in a modulation of the surface that represent the data signals. In a variation, the base element is an optoelectronic chip. In another variation, the device has a frame connected to the base element. The piece of media is attachable to the frame such that the piece of media is movable relative to the base element. As a result, the target surface moves in a first direction relative to the base element. An oscillating motor connected between the frame and the base element oscillates the base element relative to the target surface. In another variant, the target surface is moved continuously in the first direction at a constant speed. In still another variant, a direction of an oscillation of the base element has a component substantially perpendicular to the first direction. In still another variant, the controller is programmed to convey substantially all of the light from the light source sequentially toward each of the multiple output apertures. A feature is provided in another embodiment, wherein the controller is programmed to interrupt, selectively, a final conveyance of the light to a respective one of the apertures by switching the light from a path connecting to one of the output apertures to a beam dump in response to the data signals. In this way, an output from the multiple output apertures is modulated without modulating the laser source. According to another feature the controller is programmed to modulate light emitted from the multiple output apertures by selectively conveying the light from the light source to the beam dump to prevent light from being emitted from at least one of the multiple apertures and conveying the light from the light source to the multiple output apertures to emit light from the output apertures. A variant provides that the light source is a laser and the base element is an optoelectronic chip with the laser built into the chip. Another variant provides that the light source directs all of the light into a first of the light guides which connects with second and third light guides through a first of the switches. The light is directed through the second light guide, which leads to a first output aperture, when the first switch is in a first position and the light is directed through the third light guide when the first switch is in a second position. Another alternative provides that the first light guide has a second switch capable of directing the all of the light to the (at least one) beam dump. Alternatively, the second light guide has a second switch while the third light guide has a third switch, and they are configured to direct the all of the light to the at least one beam dump, selectively. Another feature provides a focusing element between the output apertures and the target surface to image light from the output apertures onto the target surface.

According to still another embodiment, the invention provides a multiple, parallel-channel data writing device for writing on media. The device has a write head with output apertures, each corresponding to an output channel. Further, the device provides imaging optics between the media and the write head to focus light emitted from the output apertures simultaneously on the media. As a result, a state of the media is altered and the media is written on. A controller is programmed and connected to modulate light emitted from the output apertures responsively to an external data stream. An oscillating motor, mechanically connected between the media and the write head, oscillates the write head along a first direction at least partly perpendicular to a unidirectional feed direction of the media. As a result of this feature, the oscillation of the write head combined with a modulation of the modulated light emitted from the output apertures, causes data derived from the external data stream onto the media to be written over an area substantially proportional to a cross product of the first direction and the unidirectional feed direction. In a variant, the area is substantially proportional to a number of the output apertures.

In another variant, the rate of data writing of the write head is proportional to a rate of feed of the media relative to the write head. Another variant provides that the write head contain a laser which is run continuously and provides that the device include at least one optoelectronic switch. The light from the output apertures is modulated by switching the optoelectronic switch between the output apertures and a beam dump in the write head. In another variant the write head has two lasers connected by an optoelectronic switch to a light guide leading to the output apertures. The switch may connect one of the two lasers to a given output aperture by default and the other of the two lasers to the given output aperture when the default laser fails. In a further variation, the write head oscillates relative to the media and the imaging optics. Alternatively, the imaging optics are fixed relative to the write head. A further option provides that the write head is an optoelectronic chip with integrally formed waveguides and switches formed photo-lithographically therein.

According to still another embodiment, the invention provides a multiple parallel-channel data writing device for writing on media. The device has a write head with output apertures, each corresponding to an output channel. Imaging optics between the media and the write head focus light emitted from the output apertures simultaneously on the media. This alters a state of the media resulting in a writing operation. A controller is programmed and connected to modulate light emitted from the output apertures responsively to an external data stream. An oscillating motor, mechanically connected to the imaging optics between the media and the write head, oscillates the imaging optics in such a way that images of light emitted from the output apertures are oscillated on the media along a first direction at least partly perpendicular to a unidirectional feed direction of the media with respect to the write head. As a result of an oscillation of the write head and a modulation of the modulated light emitted from the output apertures, the device writes data derived from the external data stream onto the media over an area substantially proportional to a cross product of the first direction and the unidirectional feed direction. According to a variation the area is substantially proportional to a number of the output apertures. According to another variation, a rate of data writing of the write head is proportional to a rate of feed of the media relative to the write head. Another variant provides that the write head contains a laser which is run continuously and at least one optoelectronic switch. The light from the output apertures is modulated by switching the optoelectronic switch between the output apertures and a beam dump in the write head. In another variant, the write head has two lasers connected by an optoelectronic switch to a light guide leading to the output apertures. The switch connects to one of the two lasers to the output apertures by default and to another of the two lasers when the one of the two lasers fails.

DETAILED DESCRIPTION OF THE EMBODIMENTS

Figure 2:
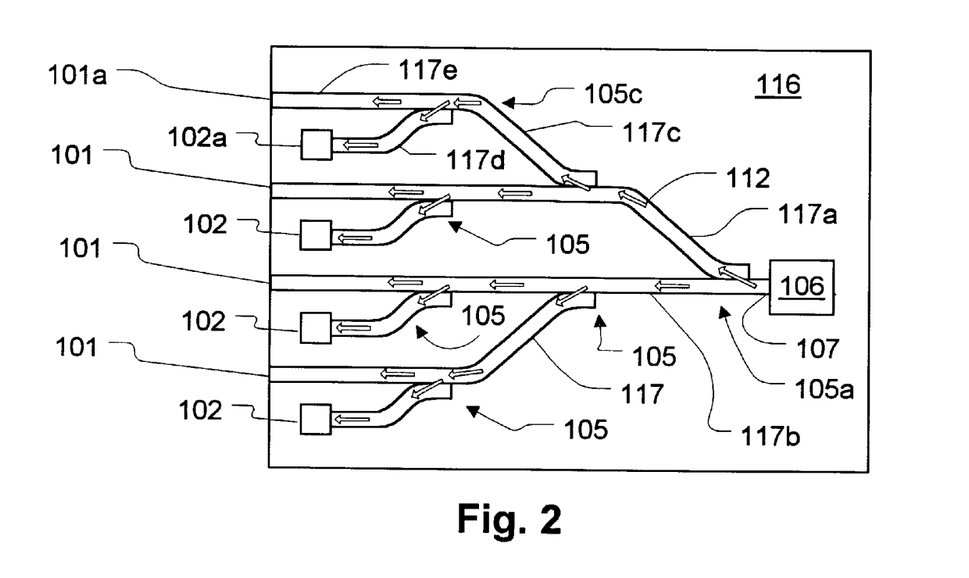
FIG. 2 is an illustration of an optoelectronic chip with integral waveguides, beam switches, a laser source, and beam dumps to allow the generation of a modulated signal using one laser source through multiple channels simultaneously.

Referring to FIG. 2, an integrated optoelectronic chip 116 produces multiple modulatable outputs at 101. Beam dumps 102 absorb and dissipate any light signal applied to them. Beam switches at 105 (including 105a, 105b, and 105c) allow control of the direction of light emitted from an on-board laser 106 which enters an array of light guides 117 (including branches 117a–117e) formed in the chip 116 at an entry point 107. By switching between a respective beam dump 102 and a respective output 101, beam switch 105 is used to modulate the outputs 101 of the chip 116. The light emitted can be imaged onto a target surface by a lens system or a single holographic element. In an alternative embodiment, instead of dumping the light to a beam dump, it can also be directed away from the target surface.

An optoelectronic chip for modulating multiple outputs can be formed as shown in FIG. 2 without an embedded laser 106. Instead, a separate laser (not shown) may be connected to a chip having light guides 117, optoelectronic switches 105, and beam dumps 102, only.

The light guides 117 (or optical wave guides) are formed directly in the chip 116 using fabrication techniques similar to those employed in the manufacture of integrated circuits. Optoelectronic chips are formed in a layer-by-layer process beginning with a suitable substrate such as silicon or glass wafer. A thin metal film is applied to the substrate and patterned to define electrodes and conductors. Next, a layer of material is added to form the optical waveguides and the material is patterned using photolithography. Switches may be formed by doping the material (or by other known methods) to create non-linear optical effects in the switching regions. In a purely additive process, additional material layers can be applied sequentially, on each of which additional optical paths, electrodes, and conductors can be formed.

Figure 3:
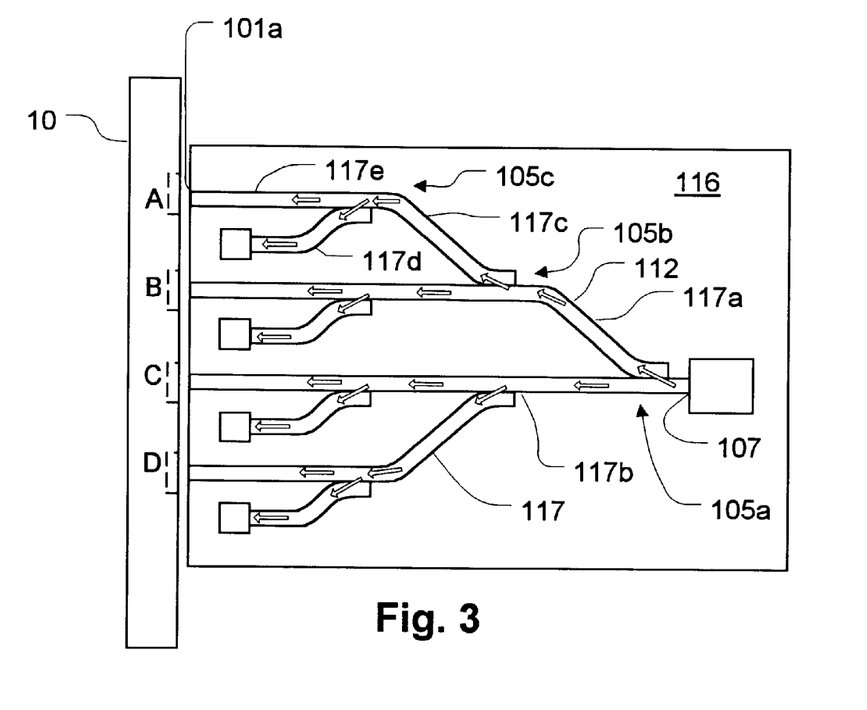
FIGS. 3 and 4 are diagrams for discussing the operation of the embodiment of FIG. 2.

Referring now also to FIG. 3, light enters the array of light guides 117 through entry port 107. Thereafter, light travels as indicated by arrows 112. At each optical switch, light is directed along one of two possible paths or can be divided by some percentage between guides. For example, light entering switch 105a can be switched to transmit the light entering through entry port 107 along branch 117a or branch 117b. If, for example, at a particular time, a datum is to be written at a position A on the medium 10 by impinging light energy at a first time and then, subsequently, at a second time, preventing any light from falling on region A and assuming no light is to impinge on any of the regions A through D during the second time interval, then the various switches would be controlled as follows. During the first time interval, optical switches 105a, 105b, and 105c would be set to direct light along the path 117a-117c-117e so that light is emitted from an output 101a. At the beginning of the second time interval, switches 105a and 105b can remain in their positions and switch 105c is switched to direct light along path 117d causing the light to be absorbed in beam dump 102a. The above is only an example. By extension, it is apparent that through appropriate control of the various switches 105, light can be emitted from any of the ports, one at a time, and during any time required, the switches 105 can be controlled so that no light is emitted at all. Through this configuration, a single light source can be used to write multiple tracks of data which saves the cost of parts and the power required to operate the light source. In addition, power does not have to be cycled to the light source to control it and this can result in lower stress on the light source component. For a laser, this means it can operate in a continuous wave (CW) long lifetime, stable mode.

The utility of the invention is apparent in the following scenario. Assume that the maximum output power from a single laser is enough (after system losses), to supply several (e.g., four) optical scanning channels. A read/write head with the chip 116 would use the switching functions to direct the laser output to the four output channels in parallel (meaning dividing power between the guides) with precise synchronization to address each channel at any time when its output was positioned to write. If a channel is writing to the scanned surface, modulation of that channel is done using the last switch (e.g. 105c) before the output aperture 101a. The chip 116 uses the last switch in a series to divert the laser output to a respective beam dump. For example, if a "zero" is written by modulating the light output to zero output, the respective switch (e.g., 105a) is controlled to direct the light to a beam dump 102. A control regime might control all of the switches 105 except the final ones, to direct the light cyclicly toward the four outputs 101. The final switches would be used synchronously with the cyclic control of the non-final switches, to modulate the pulses of light directed toward them.

Figure 4:
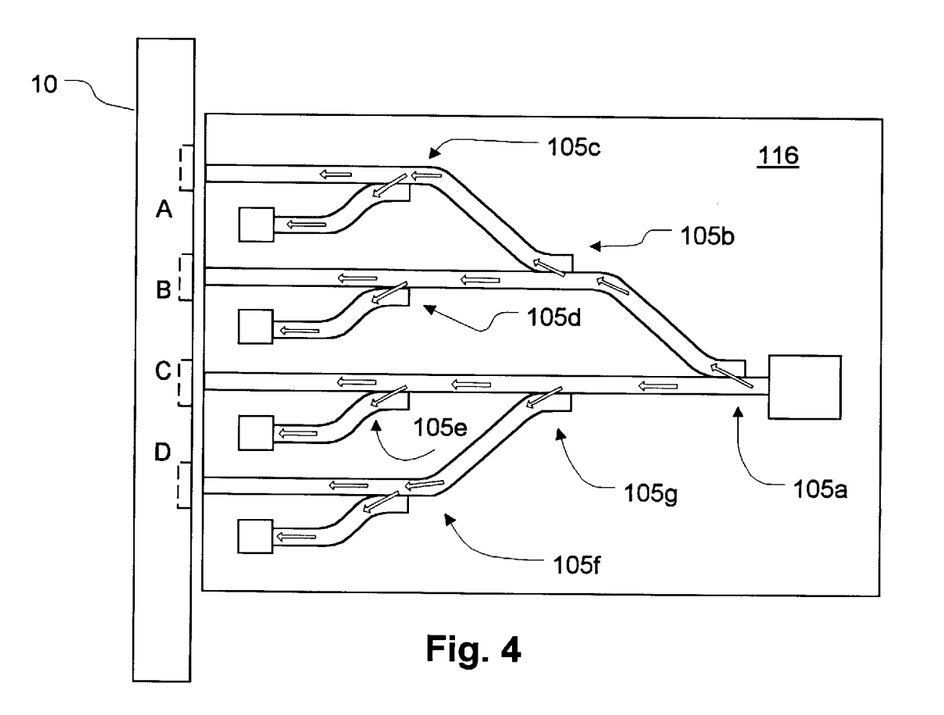

Referring to FIG. 4, the following table summarizes the switching aspect of such a control regime to cyclicly direct the light toward the four target regions.

| target region | Switch positions |||
|---|---|---|---|
|  | 105a | 105b | 105g |
| A | Bypass | bypass | no effect |
| B | Bypass | through | no effect |
| C | Through | no effect | through |
| D | Through | no effect | bypass |

The following table indicates how the switches are set to direct light toward a particular region ("on") or modulate light off when light is directed toward that region ("off").

| Target region | Switch positions |||||||
|---|---|---|---|---|---|---|---|
|  | 105c | 105d | 105e | 105f | 105a | 105b | 105g |
| A-on | Through | no effect | no effect | no effect | bypass | bypass | no effect |
| B-on | no effect | through | no effect | no effect | bypass | through | no effect |
| C-on | no effect | no effect | through | no effect | through | no effect | through |
| D-on | no effect | no effect | no effect | through | through | no effect | bypass |
| A-off | Bypass | no effect | no effect | no effect | bypass | bypass | no effect |
| B-off | no effect | bypass | no effect | no effect | bypass | through | no effect |
| C-off | no effect | no effect | bypass | no effect | through | no effect | through |
| D-off | no effect | no effect | no effect | bypass | through | no effect | bypass |

Figure 5:
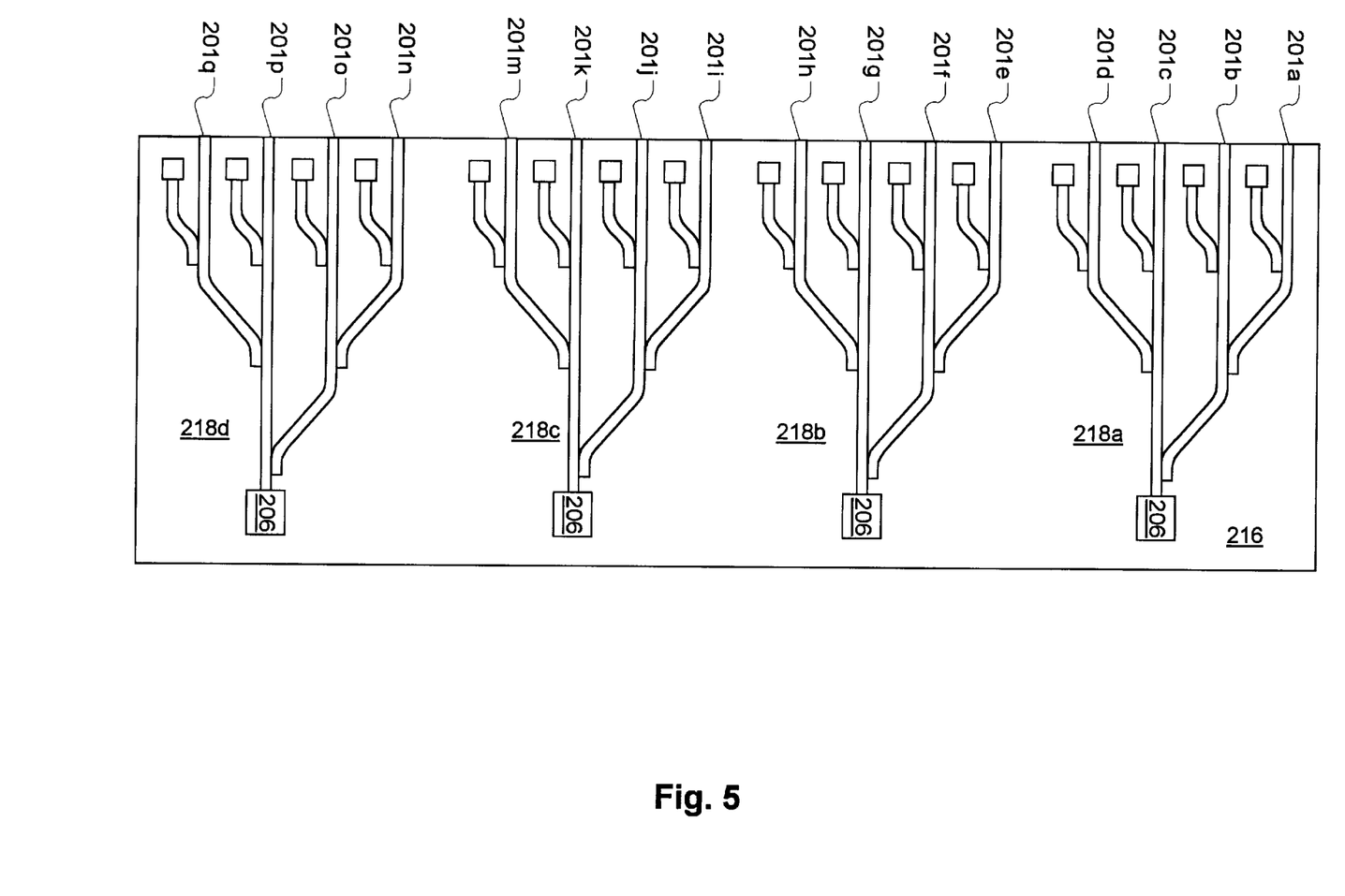
FIG. 5 is an illustration of another optoelectronic chip with more elements including, as in the embodiment of FIG. 2, integral waveguides, beam switches, a laser source, and beam dumps to allow the generation of a modulated signal using one laser source through multiple channels simultaneously.
Figure 6:
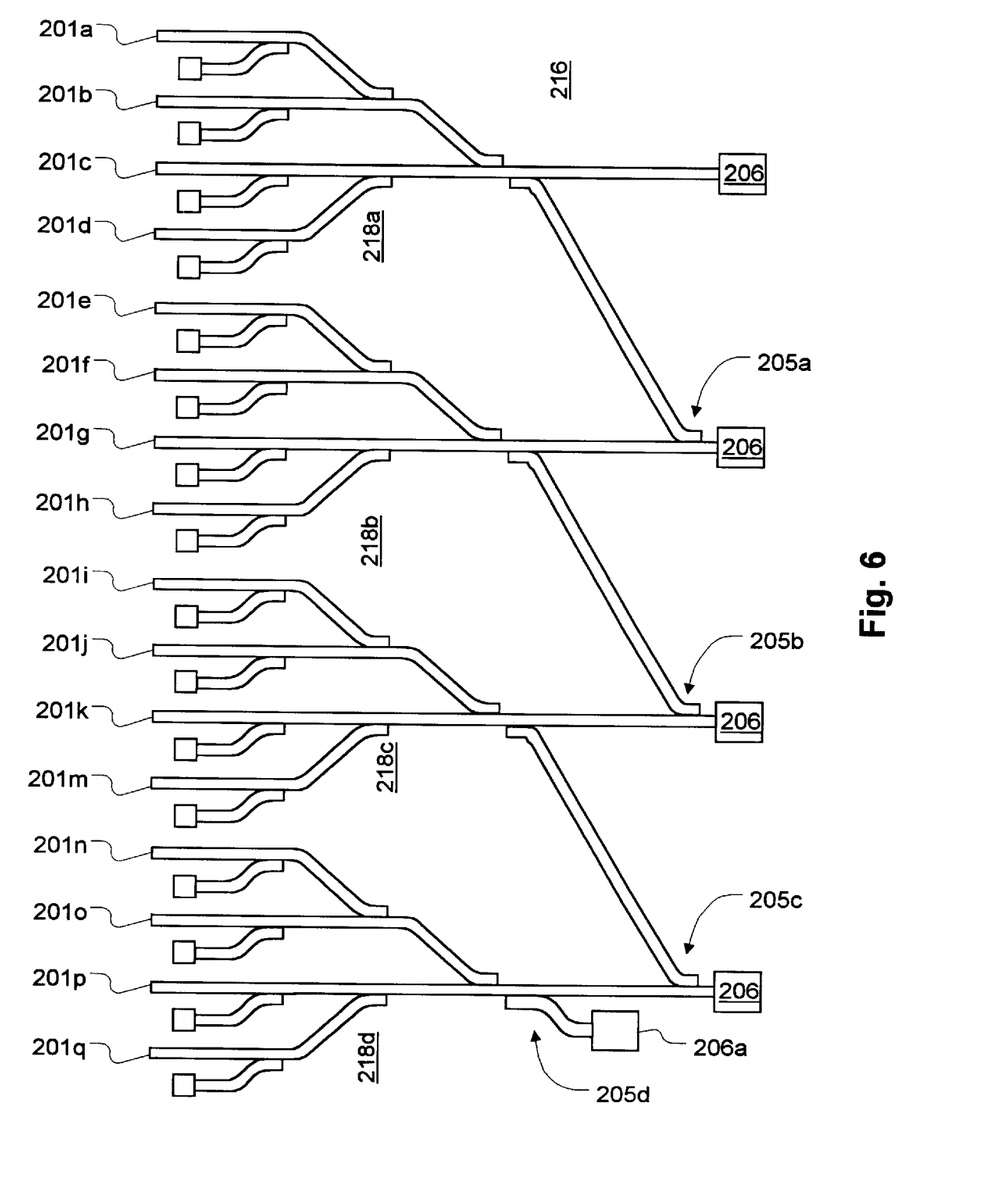
FIG. 6 is an illustration of an embodiment similar to that of FIG. 5 in which lasers sources are supplied with crossover backup connections by means of light guides and additional switching.

Referring now to FIG. 5, an example of a chip 216 with sixteen outputs 201a–201q and employing four inputs each connected to a respective laser 206. In the embodiment of FIG. 5, four devices 218a–218d, essentially the same as shown in FIG. 4 are ganged on one chip. A more elaborate design that includes more extensive crossover is shown in FIG. 6. In this embodiment, when one light source fails, at least one other can be used to permit continued operation. Additional switches 205a–205d can be used to supply light from adjacent lasers 206 into a given path. An additional laser 206a is included to provide backup for an orphaned set of outputs. Note that the crossing light guides could be used if they are fabricated on separate layers with the junctions formed deep enough to permit connections.

Figure 7:
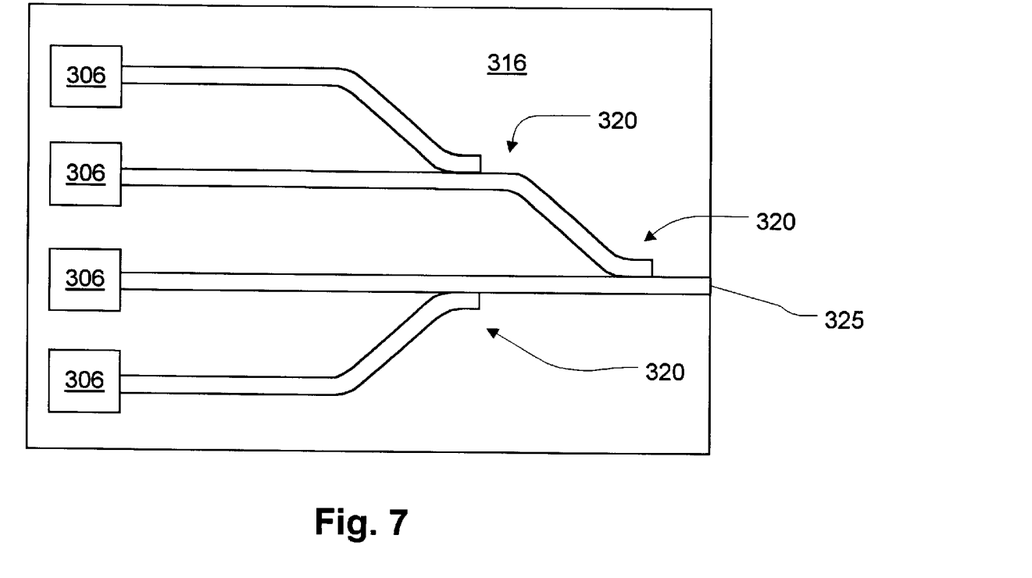
FIG. 7 is an illustration of a group of lasers formed in an optoelectronic chip interconnected by combiners to combine the energy of the lasers into one source.

Referring now to FIG. 7, the outputs of multiple lasers 306 can be combined for an application that requires an output intensity greater than a single laser can produce alone. In an optoelectronic chip 316, multiple optical rail taps 320 are used to combine the outputs of more than one laser 306. In this embodiment, four lasers combine to generate one combined output 325. This embodiment is particularly useful for use with laser devices such as vertical cavity surface emitting lasers (VCSELs) when used to write on materials requiring several milliwatts of power.

Using combinations of features of the embodiments of FIGS. 6 and 7, a many sources-to-many outputs device could be constructed. In that case, the frequency of writing could be increased because, if one laser is occupied during a writing phase and a second output needs a light source during that time period, it can be supplied by another unoccupied laser.

Figure 8:
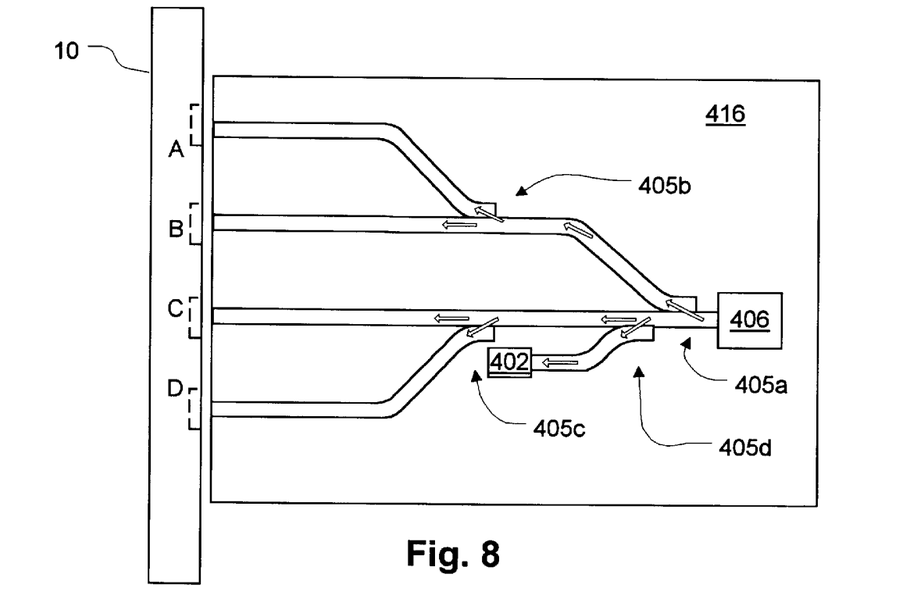
FIG. 8 is an embodiment similar to that of FIG. 2 except that a single beam dump is used for modulation instead of multiple beam dumps.

Referring to FIG. 8, another embodiment is similar to that of FIG. 4. However, instead of using multiple local beam dumps 102a–102d, a single beam dump 402 is used. For this embodiment, during a cycle when no data is to be written, the switch 405d is set to bypass and the beam is dumped.

Figure 9:
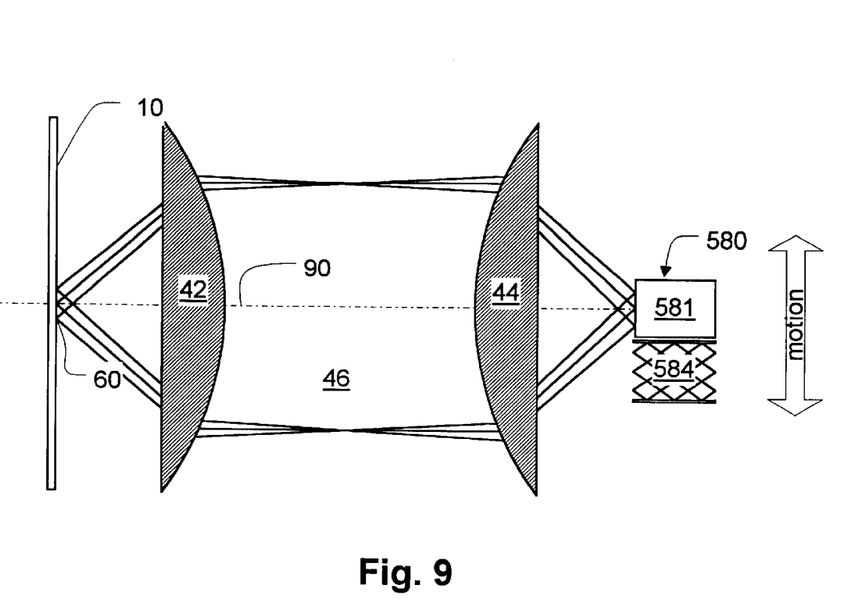
FIG. 9 is a ray trace diagram showing a multiple channel scanning head according an embodiment of the invention, where the imaging optics are fixed and the scanning head is oscillated by a MEMS motor to scan a region of a target surface.

Referring to FIG. 9, the small size of the embodiments discussed above lends itself to scanning using small motors such as microelectromechanical systems (MEMS) technology motors. In an embodiment of the invention, a multiple output scanning head, optoelectronic (OE) chip 581 according to any of the previous embodiments discussed, has multiple outputs, as described. Although the drawings only indicate ray traces for three beams, it is understood that the drawing is compatible with any number of outputs. OE chip 581 is oscillated by a motor 584, based on MEMS technology. A scanning motion of multiple spots 60 can be obtained with this arrangement. The multiple focused spots 60 will scan over the surface 10 when the source array 580 is oscillated relative to the optical axis 90 of the lens system. In the embodiment of FIG. 9, the lens system 46 is held fixed and the OS chip 581 is oscillated. In a nominal lens system with 1:1 magnification, the spots move along the surface 10 the same distance as the stage 581.

Figure 10:
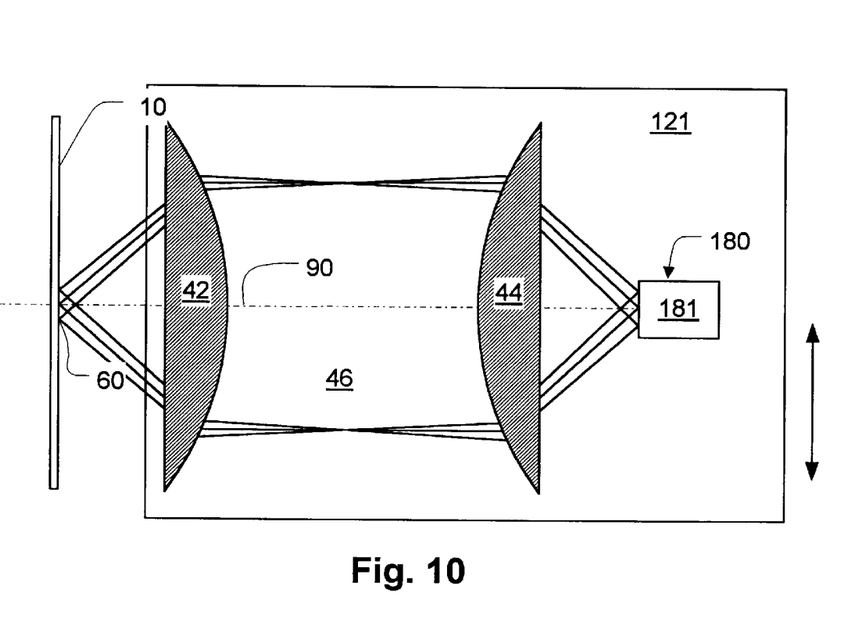
FIG. 10 is a ray trace diagram showing a multiple channel scanning head according an embodiment of the invention, where the imaging optics and scanning head are fixedly interconnected and oscillated as a unit by a MEMS motor to scan a region of a target surface.
Figure 11:
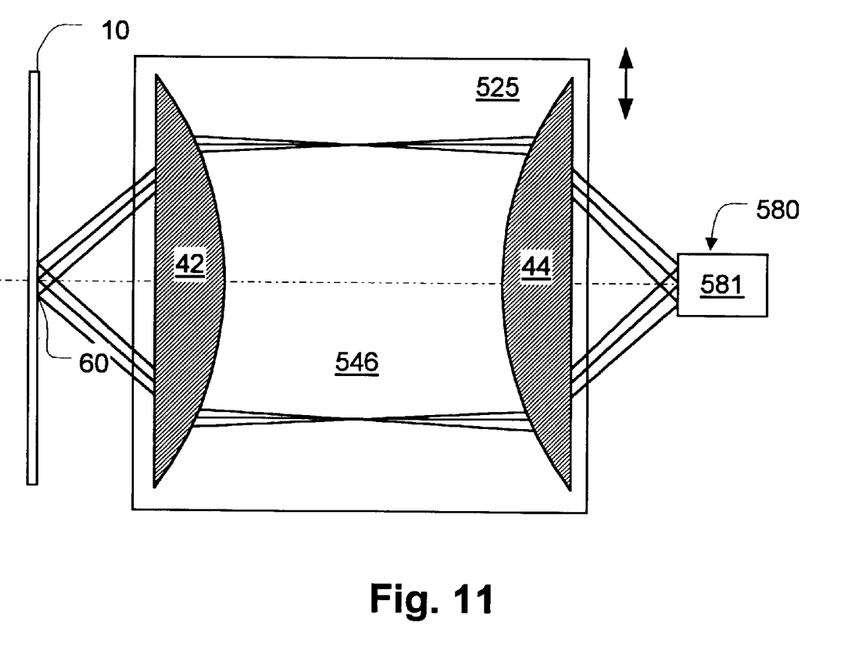
FIG. 11 is a ray trace diagram showing a multiple channel scanning head according an embodiment of the invention, where the imaging optics are oscillated as a unit by a MEMS motor to scan a region of a target surface.

Referring to FIG. 10, in an alternative embodiment, similar to that of FIG. 9, the focusing optics 46, as well as the light guide array 180, is oscillated. The focusing optics 46 and the light guide array 180 are supported on a large stage 121 which is oscillated by a motor (not shown). Referring to FIG. 11, in still another embodiment, lens system 46 is supported on stage 125 that is oscillated relative to both the scanned surface 10 and the source array 180. With a magnification of 1:1, the light spot is displaced twice the displacement of the focusing device.

Figure 12:
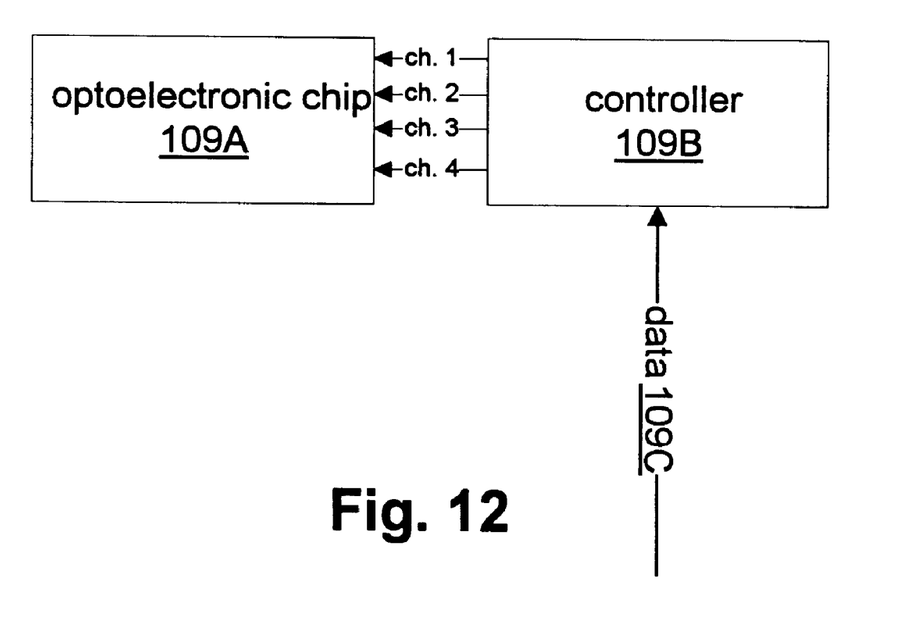
FIG. 12 is an illustration of a controller that controls an optoelectronic chip.

Referring to FIG. 12, a controller 109B controls any of the optoelectronic chips, represented by 109A and discussed above, by controlling various optoelectronic switches (discussed above). Synchronization of the timing of the control signals, which modulate according to an input data stream 109C to control the optoelectronic switches, could be achieved by reading fiducial marks formed in the media in advance and sending timing signals to the controller, by having the controller write fiducial marks on the media using timing information based on the rate of movement of the media with respect to the writing device. Such techniques are known in the prior art. Controller 109B controls which channels receive light and whether those channels are modulated on or off for writing a given media area. Note the controller 109B may also control light source power.

Using the invention, laser light can be allocated among several output channels with very fast switching rates for optimum use of power for both reading and writing applications. Furthermore, using this approach of lithography, high accuracy spacing and positioning of the output apertures can also be achieved independently of any limits on laser fabrication. Cost savings can also be achieved. Single laser outputs requiring more power than can be achieved with single laser can be supported by using the output-combining feature described. In addition, laser output can be modulated without directly varying laser output power, thus allowing the laser to operate in a continuous wave (CW), long-lifetime, stable mode.

The best MEMS scanning method depends on the practical engieering tradeoffs attending the specific application. For example, the mass of the moving element, the amplitude of the oscillation, and the frequency. One optimization goal might be to opt for high frequency and therefore favor minimum mass of the moving element. This would suggest an individual fiber is best. Engineering, however, places other constraints on the application, for example, the actual position of the surface emitting the light relative to the focal point of the optics. See for example, Brei et. al, incorporated herein by reference below.

Regarding the manufacturing of MEMS devices, for example, the light emitting aperture, shape and surface treatment, manufacturing issues are not a problem. For example methods have been developed to apply metals to glass fibers to enable capacitive coupling for driving the fiber motion. Individual methods of fabrication and then manufacture may be addressed depending on the availability of resources, e.g. metallization of a polymer "fiber" or waveguide, or application of piezoelectric material to a polymer. Regarding the optical properties of the fiber output, particularly with regard to numerical aperture (NA), some trial and error experimentation may be required to achieve an optimum configuration. If constructed layer by layer, the fiber tip construction is totally conventional. The optical quality and properties of the exit aperture as mentioned above are critical, and therefore exact recipes may require some trial and error experimentation. For example, a graded index clad may be necessary, or new process methods due to required design considerations. In embodiment employing an optical fiber, the exit aperture may be defined by cleaving. In embodiment employing a multilayer (e.g. polymer) structure, processing at the end of the fiber is important. Conventional methods at present include ion beam "polishing" of the tip or exit aperture.

The cantilever "style" vibrating fiber structure requires a waveguiding "core," as with any optical fiber. Also a cladding is required to confine the optical energy. The fiber, or, more generally, light guide, can have a round, square, or rectangular cross section depending on design considerations for the purpose of light "piping." A square or rectangular cross section is easiest to deal with from a manufacturing and fabrication point of view, as well as from the point of view of driving oscillations. Planar "capacitive" plates are easily implemented in a layered, bimorph configuration that optimizes energy transfer for driving oscillation while minimizing the required power. However, this puts severe constraints on optical design due to the need for polarization conservation elsewhere in the system, as well as mode conservation and balance. A layer by layer fabrication process is the best approach; in that case, the "fixed end" of the fiber is on top of the underlying structural and functional layers. The quality checks necessary are both optical and mechanical. Longevity will be related to mechanical work, with frequency, total number of oscillations, material, composite structures, adhesion, etc. also being contributing factors.

Note, regarding a fundamental mechanism of failure in stressed single crystal materials, such as Si, defects in single crystals diffuse thermally and aggregate in the material. This is well known (see for example Silicon Processing for the VLSI Era, S. Wolf and R. N. Tauber, Lattice Press and other books addressing the processes in Si fabrication, particularly crystal growth).

The electro-optical switch and the optical railtap (directional coupler) are both components that have been developed in other integrated optics material systems (e.g. lithium niobate). They have also been developed in polymer-based integrated optics.

Note that various embodiments could make use of the same lasers for both reading and writing, as discussed above. In such a case, a head could have separate exit apertures for reading and for writing, or have one set of apertures serving both functions.

The respective entireties of the following United States patent applications, filed concurrently herewith, are hereby incorporated by reference in the present application:

Scanning Device Using Fiber Optic Bimorph (Adam Thomas Drobot, Robert Courtney White)

Multiple Parallel Source Scanning Device (Adam Thomas Drobot, Robert Courtney White, Newel Convers Wyeth)

Multiple Channel Scanning Device Using Optoelectronic Switching (Adam Thomas Drobot, Robert Courtney White, Newel Convers Wyeth)

Method and Apparatus for Controlling the Focus of a Read/Write Head for an Optical Scanner (Edward Alan Phillips, Newel Convers Wyeth)

Multiple Channel Scanning Device Using Oversampling and Image Processing to Increase Throughput (Adam Thomas Drobot, Robert Courtney White, Newel Convers Wyeth, Albert Myron Green, Edward Alan Phillips)

The respective entireties of the following references are hereby incorporated by reference in the present application:

M. Ataka, A. Omodaka, N. Takeshima, and H. Fujita, "Fabrication and Operation of Polyimide Bimorph Actuators for a Ciliary Motion System", JMEMS, Volume 2, No. 4, page 146.

D. E. Brei and J. Blechschmidt, "Design and Static Modeling of a Semicircular Polymeric Piezoelectric Microactuator", JMEMS, Volume 1, No. 3, page 106.

J. W. Judy, R. S. Muller, and H. H. Zappe, "Magnetic Microactuation of Polysilicon Flex-ure Structures", JMEMS, Volume 4, No. 4, page 162.

T. S. Low and W. Guo, "Modeling of a Three-Layer Piezoelectric Bimorph Beam with Hysteresis", JMEMS. Piezoelectric actuators are usually stacked or bimorph in configu-ration. In this paper the mechanics of a three-layer piezoelectric bimorph is discussed and its dynamic model with hysteresis is presented. The results can be used to analyze piezoe-ectric actuators constructed with three-layer piezoelectric bimorphs.

Q. Meng, M. Mehregany, and R. L. Mullen, "Theoretical Modeling of Microfabricated Beams with Elastically Restrained Supports", JMEMS, Volume 2, No. 3, page 128 et. seq.

K. Minami, S. Kawamura, and M. Esashi, "Fabrication of Distributed Electrostatic Micro Actuator (DEMA)", JMEMS, Volume 2, No. 3, page 121 et. seq.

J. G. Smits, and A. Ballato, "Dynamic Admittance Matrix of Piezoelectric Cantilever Bi-morphs", JMEMS, Volume 3, No. 3, page 105 et. seq.

Yuji Uenishi, Hedeno Tanaka, and Hiroo Ukita, NTT Interdisciplinary Research Laborato-ries (Tokyo, Japan), "AlGaAs/GaAs micromachining for monolithic integration of optical and mechanical components", Optical power driven cantilever resonator. Proceedings SPIE et. seq.

What is claimed is:

1. A device for writing data to a target surface of a piece of media whose structure can be modified by impingement of light, comprising:

a base element with a light source, light guides, optical switches, multiple output apertures, and at least one beam dump interconnected such that light from said light source is selectively conveyed to said multiple output apertures and to said at least one beam dump;

said multiple output apertures being arranged relative to said target surface such that light emitted from said multiple output apertures impinges on said target surface;

a controller connectable to receive data signals;

said controller being connected to control said switches; and said controller being programmed to control said switches to selectively convey light to said multiple output apertures and said at least one beam dump such that said light is impinged on said target surface in such a way as to result in a modulation of said surface that represent said data signals.

2. A device as in claim 1, wherein said switches distribute light from said light source to more than one of said multiple output apertures according to a percentage determined by said controller.

3. A device as in claim 1, wherein said base element comprises an optoelectronic chip formed by lithography.

4. A device as in claim 1, further comprising:

a frame connected to said base element; and said piece of media being attachable to said frame such that said piece of media is movable relative to said base element, whereby said target surface moves in a first direction relative to said base element;

an oscillating motor connected between said frame and said base element to oscillate said base element relative to said target surface.

5. A device as in claim 4, wherein said target surface is moved continuously in said first direction at a constant speed.

6. A device as in claim 5, wherein a direction of an oscillation of said base element has a component substantially perpendicular to said first direction.

7. A device as in claim 4, wherein said controller is programmed to convey substantially all of the light from said light source sequentially toward each of said multiple output apertures.

8. A device as in claim 7, wherein said controller is programmed to interrupt, selectively, a final conveyance of said substantially all of said light to a respective one of said multiple apertures by switching said light from a path connecting to said respective one of said multiple output apertures to said at least one beam dump, responsively to said data signals, whereby an output from said multiple output apertures is modulated without modulating said light source.

9. A device as in claim 1, wherein said controller is programmed to modulate light emitted from said multiple output apertures by selectively conveying said light from said light source to said beam dump to prevent light from being emitted from at least one of said multiple apertures and conveying said light from said light source to said multiple output apertures to emit light from said output apertures.

10. A device as in claim 1, wherein said light source comprises a laser and said base element comprises an optoelectronic chip with said laser built into said chip.

11. A device as in claim 1, wherein:

said light source directs all of said light into a first of said light guides which connects with second and third of said light guides through a first of said switches; and said light being directed through said second of said light guides, which leads to a first of said multiple output apertures, when said first of said switches is in a first position and said light being directed through said third of said light guides when said first of said switches is in a second position.

12. A device as in claim 11, wherein, said first of said light guides has a second of said switches capable of directing said all of said light to said at least one beam dump.

13. A device as in claim 11, wherein:

said second of said light guides has a second of said switches;

said third of said light guides has a third of said switches; and said second and said third is capable of directing said all of said light to said at least one beam dump.

14. A device as in claim 11, further comprising a focusing element between said output apertures and said target surface to image light from said output apertures onto said target surface.

15. A device as in claim 1, further comprising a focusing element between said output apertures and said target surface to image light from said output apertures onto said target surface.

16. A device as in claim 15, wherein said focusing element is in a fixed position relative to said base element.

17. A device as in claim 1, wherein:

said light source comprises a first laser for selectively conveying light to a first group of said multiple output apertures in a default mode and a second laser for selectively conveying light to a second group of said multiple output apertures in a default mode; and a switching means for selectively conveying light from said first laser to said first and said second groups of output apertures when said second laser fails.

18. A device as in claim 1, wherein said light source comprises a continuous wave laser.

19. A device for writing data to a target surface of a piece of media supported by a frame and whose structure can be modified by impingement of light, comprising:

a base element with a light source, light guides, optical switches, multiple output apertures, and at least one beam dump interconnected such that light from said light source is selectively conveyed to said multiple output apertures and to said at least one beam dump;

said multiple output apertures being arranged relative to said target surface such that light emitted from said multiple output apertures impinges on said target surface;

a controller connectable to receive data signals;

said controller being connected to control said switches;

said controller being programmed to control said switches to selectively convey light to said multiple output apertures and said at least one beam dump such that said light is impinged on said target surface in such a way as to result in a modulation of said surface that represent said data signals; and a means for moving said base element relative to said frame.

20. A device as in claim 19, wherein said switches distribute light from said light source to more than one of said multiple output apertures according to a percentage determined by said controller.

21. A device as in claim 19, wherein said base element comprises an optoelectronic chip formed by lithography.

22. A device as in claim 19, wherein:

said piece of media is attachable to said frame such that said piece of media is movable relative to said base element, whereby said target surface moves in a first direction relative to said base element; and said means for moving said base element relative to said frame comprises an oscillating motor.

23. A device as in claim 22, wherein said target surface is moved continuously in said first direction at a constant speed.

24. A device as in claim 23, wherein a direction of an oscillation of said base element has a component substantially perpendicular to said first direction.

25. A device as in claim 22, wherein said controller is programmed to convey substantially all of the light from said light source sequentially toward each of said multiple output apertures.

26. A device as in claim 25, wherein said controller is programmed to interrupt, selectively, a final conveyance of said substantially all of said light to a respective one of said multiple apertures by switching said light from a path connecting to said respective one of said multiple output apertures to said at least one beam dump, responsively to said data signals, whereby an output from said multiple output apertures is modulated without modulating said laser source.

27. A device as in claim 19, wherein said controller is programmed to modulate light emitted from said multiple output apertures by selectively conveying said light from said light source to said beam dump to prevent light from being emitted from at least one of said multiple apertures and conveying said light from said light source to said multiple output apertures to emit light from said output apertures.

28. A device as in claim 19, wherein said light source comprises a laser and said base element comprises an optoelectronic chip with said laser built into said chip.

29. A device as in claim 19, wherein:

said light source directs all of said light into a first of said light guides which connects with second and third of said light guides through a first of said switches;

said light being directed through said second of said light guides, which leads to a first of said multiple output apertures, when said first of said switches is in a first position and said light being directed through said third of said light guides when said first of said switches is in a second position.

30. A device as in claim 29, wherein, said first of said light guides has a second of said switches capable of directing said all of said light to said at least one beam dump.

31. A device as in claim 29, wherein:

said second of said light guides has a second of said switches;

said third of said light guides has a third of said switches; and said second and said third is capable of directing said all of said light to said at least one beam dump.

32. A device as in claim 29, further comprising a focusing element between said output apertures and said target surface to image light from said output apertures onto said target surface.

33. A device as in claim 19, further comprising a focusing element between said output apertures and said target surface to image light from said output apertures onto said target surface.

34. A device as in claim 33, wherein said focusing element is in a fixed position relative to said base element.

35. A device as in claim 19, wherein:

said light source comprises a first laser for selectively conveying light to a first group of said multiple output apertures in a default mode and a second laser for selectively conveying light to a second group of said multiple output apertures in a default mode; and a switching means for selectively conveying light from said first laser to said first and said second groups of output apertures when said second laser fails.

36. A device as in claim 1, wherein said light source comprises a continuous wave laser.

* * * * *